W. L. E. KEUFFEL.
OPTICAL INSTRUMENT.
APPLICATION FILED MAY 28, 1913.
1,145,022.
Patented July 6, 1915.
2 SHEETS—SHEET 1.
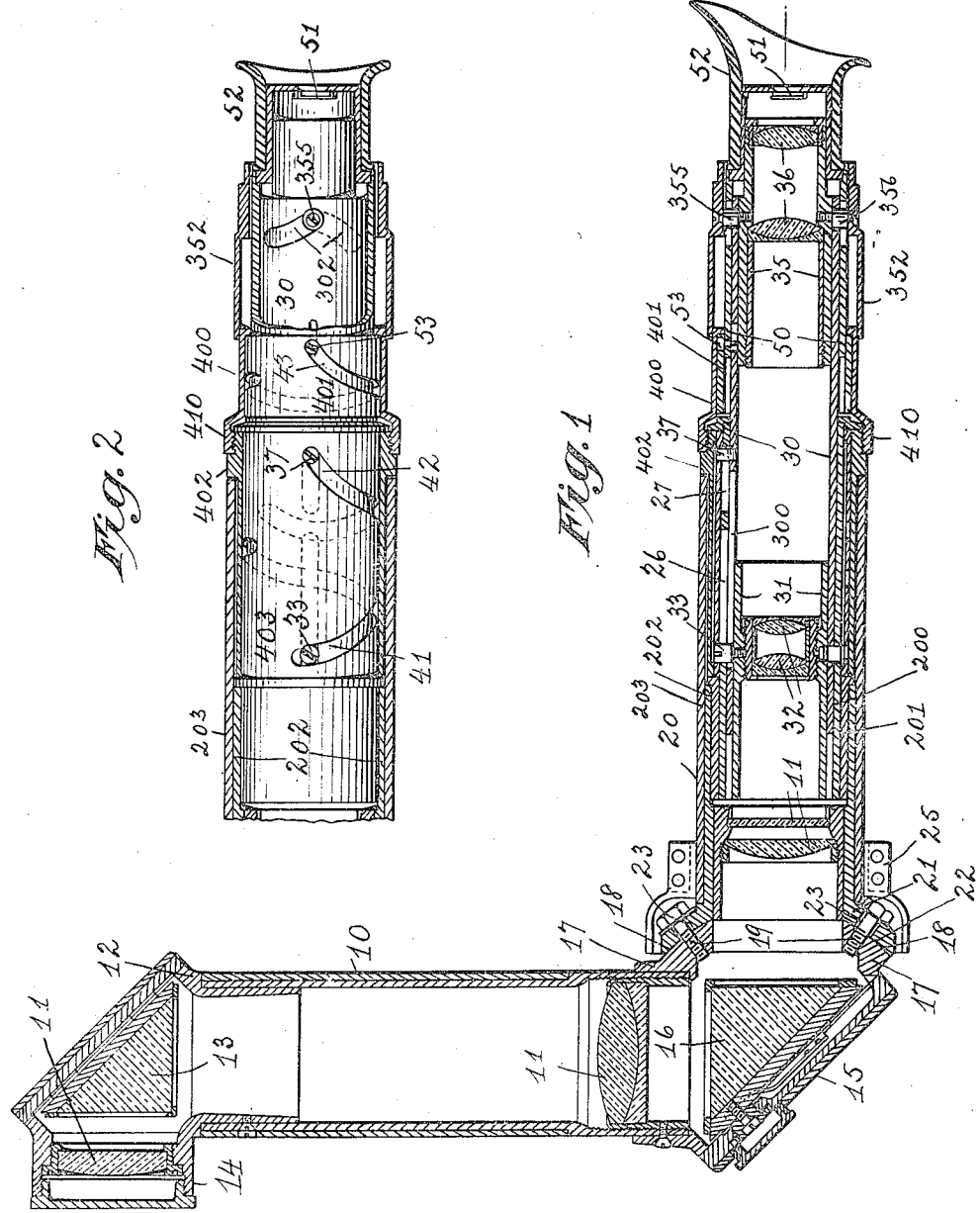
Attest:
Ben. J. Campbell
Clarence G. Campbell.
Willie L. E. Keuffel, Inventor:
by William R. Baird,
his Att'y

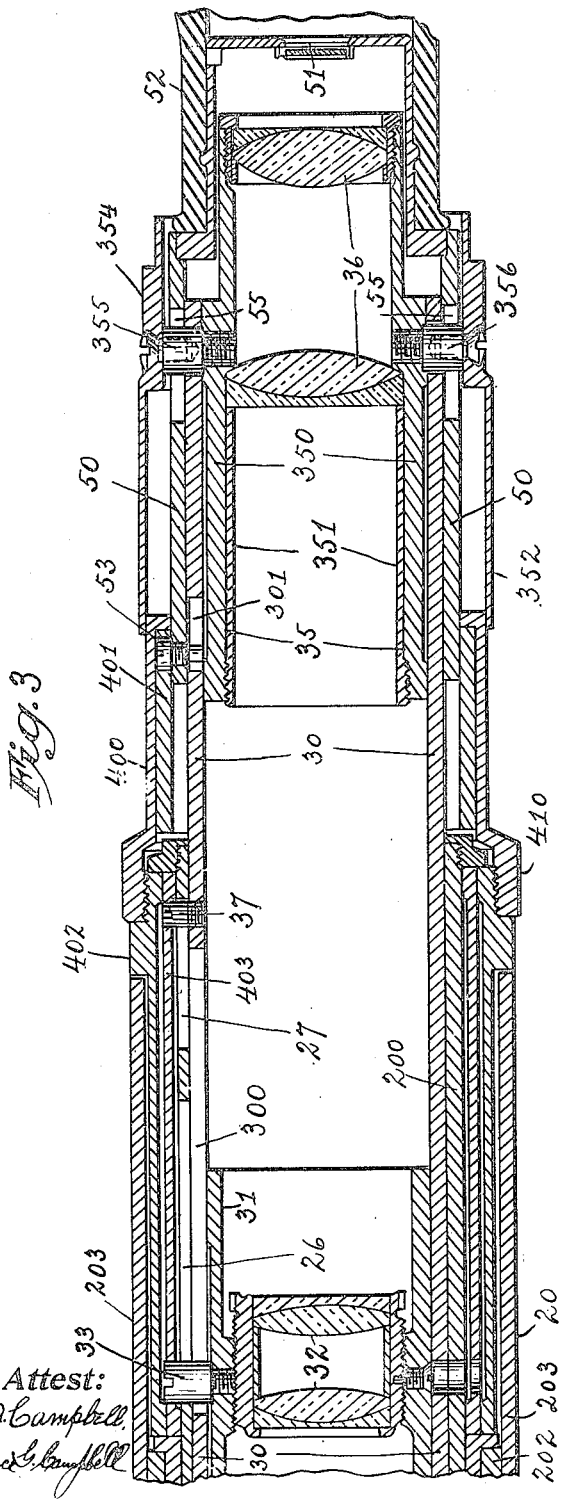

UNITED STATES PATENT OFFICE.

WILLIE L. E. KEUFFEL, OF HOBOKEN, NEW JERSEY, ASSIGNOR TO KEUFFEL & ESSER COMPANY, OF HOBOKEN, NEW JERSEY, A CORPORATION OF NEW JERSEY.

OPTICAL INSTRUMENT.

1,145,022.  Specification of Letters Patent.  Patented July 6, 1915.

Application filed May 28, 1913. Serial No. 770,336.

*To all whom it may concern:*

Be it known that I, WILLIE L. E. KEUFFEL, a citizen of the United States, residing at Hoboken, in the county of Hudson and State of New Jersey, have invented certain new and useful Improvements in Optical Instruments, of which the following is a specification.

This invention relates to optical instruments, and its novelty consists in the construction and adaptation of the parts, as will be more fully hereinafter pointed out.

It relates more specifically to an instrument intended to be mounted in close proximity to a piece of heavy ordnance for the purpose of sighting the target aimed at and which instrument has its objective system carried by a tube at an angle to the tube which carries the eye piece system; although it will be understood that the invention is applicable to other optical instruments intended for different uses.

The purpose of this invention is to provide an optical instrument which comprises an objective system of optical elements, an eye piece system of optical elements and an intermediate erecting system of optical elements, with means for varying the magnification continuously between certain limits and, when the instrument is provided with an eye shield, with means for keeping such shield and the eye piece always in proper relation to each other for all variations in the magnification, and also with means for automatically focusing the eye piece to suit the variation in magnification, after an initial focusing adjustment has been made by the observer.

In the drawings, Figure 1 is a central longitudinal section of an optical instrument embodying the invention; Fig. 2 is a similar view of the portion of the device more particularly illustrating the means for varying the magnification; Fig. 3 is a much enlarged similar section of the eye piece end of the telescope.

In the drawings, 10 is a telescope tube vertically arranged and provided at its upper end with an elbow 12 constituting a housing for a reflecting optical element indicated at 13 and which elbow has secured to it or made integral with it, a short horizontal tube 14. The tube 10 is provided at its lower end with an elbow housing 15 adapted to contain a reflecting optical element indicated at 16 and which housing terminates in an annular flange 17 having an outer spherical surface 18 and provided with threaded recesses adapted to receive the threaded ends of screws 19. 11 indicates the usual objective and regulating elements.

20 is a telescope tube horizontally arranged and provided with an annular flange 21 having an inner spherical surface 22 coinciding in curvature with the outer spherical surface 18 of the flange 17 on the tube 10, and provided with apertures 23 adapted to receive the screws 19; the apertures being somewhat larger than the diameter of the screws. An annular shield 25 secured to either the tube 10 or the tube 20 by any suitable means is adapted to protect the surface beneath it from dust, wear and improper contact. The tube 20 is made up of four concentric shells, 200, 201, 202 and 203 for purposes of assembly, the inner shell 200 being provided with two longitudinal slots 26 and 27 parallel with the central longitudinal axis of the tube. Within the inner sub-tube 200 there is arranged a tube 30 inside of which is slidably secured a tube 31 carrying erecting optical elements indicated at 32 and from which tube there projects outwardly a stud 33.

Inside of the tube 30 there are slidably arranged two sub-tubes 350 and 351, which together make up a tube 35 carrying suitable eye piece elements indicated at 36. From these tubes there outwardly project two studs 355 and 356, which connect a third outer sub-tube 352 to the two inner sub-tubes 350 and 351. This sub-tube 352 serves as a cover for the portion of the instrument which it surrounds. From the tube 30 there projects outwardly a stud 37 and it is provided with two longitudinal slots 300 and 301 parallel with its central axis and with two oppositely arranged spiral slots 302.

Intermediate the sub-tubes 203 and 200 and extending between them toward the eye piece part of the telescope is a revoluble tube made up of four concentric sub-tubes 400, 401, 402 and 403 for convenience of assembly. The inner sub-tube 403 is provided with a spiral slot 41 adapted to be engaged by the stud 33 projecting from the tube 31 and with a hyperbolic slot 42 adapted to be engaged by the stud 37 projecting from the tube 30. The sub-tube 401 is provided with a hyperbolic slot 43.

Intermediate the sub-tube 350 and the sub-tube 401 is a tube 50 adapted to carry a ray filter 51 and an eye shield or guard 52 and also provided with an outwardly extending stud 53 having its outer end engaged in the slot 43 of the sub-tube 401, and its inner end engaged in the longitudinal slot 301 of the tube 30. There are two clearance apertures 55 in the tube 50 to permit of the movement of the studs 355 and 356 therein. The outer surface of the tube 352 is knurled at 354 in order to facilitate its rotation, and the outer surface of the tube 400 is similarly knurled at 410 for the same purpose.

The operation of the device is as follows: Assuming that the parts are in the positions shown in Figs. 1 and 2, the erecting elements, the eye piece elements, the eye shield and ray filter are all arranged for the highest power of magnification of which the instrument is capable. That is, referring to Fig. 2, the stud 33 controlling the position of the erecting element tube, the stud 37 controlling the position of the eye piece element tube, and the stud 53 controlling the position of the eye shield and ray filter tube are all at the extreme ends of the several slots 41, 42 and 43 by which their movements are controlled. The observer first focuses the instrument to suit his personal equation. This is done by a rotation of the outer sub-tube 352 by means of its knurled portion 354. This moves the eye piece elements until the observer sees the cross wires of the instrument sharply defined within the field of vision. Then in order to secure the magnification desired (if the highest power is not wished for), the knurled piece 410 on the general tube 40 is rotated and the movement of the studs 33, 37 and 53 in the respective slots 41, 42 and 43 will bring the erecting element tubes, the eye piece element tubes and the eye shield and ray filter tubes in such relations that the optical elements carried by these respective tubes are moved so that the magnification is continuously varied between proper limits according to optical laws, governed by the shape and size of the slots 41, 42 and 43, and the slots 302 are so made that there is no focusing adjustment required after the initial focusing adjustment has been made, such size and shape being determined by calculation or previous experiment, or both.

Means are provided for adjusting the reflecting elements 16 at the elbow end of the telescope forming the connection between the eye piece elements and the objective elements, and which comprise, in the form which we prefer, the means described and claimed in Letters Patent of the United States No. 1,118,193, granted November 24, 1914.

The relative adjustment of the eye shield with respect to the other elements is advantageous, as will be evident when it is considered that as the magnification varies, the size of the exit pupil also varies, necessitating for the most perfect image, at full field of view, the operator varying his eye distance from the outer lens. The exit pupil being smaller at high magnification, therefore requires a closer eye distance, that is, requires that the eye is nearer the outside lens than when the exit pupil is larger, which takes place at the lower magnification, and the eye distance from the lens must be correspondingly longer. The automatically adjustable eye piece thus takes care of this.

What I claim is:

1. An optical instrument comprising a tube carrying an objective system of optical elements, a second tube carrying an erecting system of optical elements, a third tube carrying an eye piece system of optical elements, means for varying the magnification between two limits, a shield for the eye piece, and means for keeping the shield and eye piece always in proper relation for all variations of the magnification.

2. An optical instrument comprising a tube carrying an objective system of optical elements, a second tube carrying an erecting system of optical elements, a third tube carrying an eye piece system of optical elements, means for varying the magnification between the two limits, a shield for the eye piece, and means for automatically focusing the eye piece to suit the variations of magnification after an initial focusing adjustment, and keeping the shield and eye piece in proper optical relation during such variation.

3. In an instrument of the class described, a tube adapted to carry an eye shield, a stud projecting therefrom, a tube surrounding the eye shield tube and provided with a slot adapted to be engaged by the stud whereby as the second tube is rotated the first tube is longitudinally moved.

4. In an instrument of the class described, a tube adapted to carry an eye shield, a stud projecting therefrom, a tube surrounding the eye shield tube and provided with a slot adapted to be engaged by the stud whereby as the second tube is rotated the first tube is longitudinally moved in combination with means for rotating the second tube.

5. In an instrument of the class described, a tube adapted to carry an eye shield, a stud projecting therefrom, a tube surrounding the eye shield tube and provided with a slot adapted to be engaged by the stud whereby as the second tube is rotated the first tube is longitudinally moved in combination with means for holding the front tube against rotation, while permitting its longitudinal movement, and means for rotating the second tube consisting of a knurled surface external to the tube.

6. In an instrument of the class described, a tube carrying an optical element, a second tube carrying an eye piece element and longitudinally movable with respect to the first tube, a stud on the second tube, a third tube adapted to inclose the other two and provided with a spiral slot or slots adapted to be engaged by the stud of the second, and means for rotating the third tube in combination with a tube adjustable with respect to the eye piece carrying tube, said last-mentioned tube carrying an eye shield.

7. In an instrument of the class described, a tube carrying erecting optical elements, a second tube carrying eye piece optical elements and a third tube carrying an eye shield, each of said tubes being longitudinally movable with respect to the other two, and each carrying an external stud, in combination with a fourth tube having slots adapted to be engaged by said studs.

8. In an instrument of the class described, a tube carrying erecting optical elements, a second tube carrying eye piece optical elements and a third tube carrying an eye shield, each of said tubes being longitudinally movable with respect to the other two, and each carrying an external stud, in combination with a fourth tube having slots adapted to be engaged by such studs whereby as the fourth tube is rotated the three tubes are longitudinally moved with respect to each other in a manner determined by the length and shape of the slots.

9. In an instrument of the class described, a tube carrying erecting optical elements, a second tube carrying eye piece optical elements and a third tube carrying an eye shield, each of said tubes being longitudinally movable with respect to the other two, and each carrying an external stud, in combination with a fourth tube having slots adapted to be engaged by such studs whereby as the fourth tube is rotated the three tubes are longitudinally moved with respect to each other in a manner determined by the length and shape of the slots, and means for preventing the rotation of the tubes while they are longitudinally moved.

10. In an instrument of the class described, a tube carrying erecting optical elements, a second tube carrying eye piece optical elements and a third tube carrying an eye shield, each of said tubes being longitudinally movable with respect to the other two, and each carrying an external stud, in combination with a fourth tube having slots adapted to be engaged by such studs whereby as the fourth tube is rotated the three tubes are longitudinally moved with respect to each other in a manner determined by the length and shape of the slots, and means for preventing the rotation of the tubes while they are longitudinally moved consisting of longitudinal slots in a fifth tube adapted also to engage with at least one of the studs on the three tubes mentioned.

11. In an instrument of the class described, a member carrying erecting optical elements, a second member carrying eye piece optical elements and a third member carrying an eye shield, each of said members being longitudinally movable with respect to the other two, in combination with a fourth member having means for varying the longitudinal position of the eye piece optical elements carried by the second member, with respect to the erecting elements and eye shield.

12. In an instrument of the class described, a tube carrying erecting optical elements, a second tube carrying eye piece optical elements and a third tube carrying an eye shield, each of said tubes being longitudinally movable with respect to the other two, and each carrying an external stud, in combination with a fourth tube having slots adapted to be engaged by such studs, and with means for varying the longitudinal position of the eye piece optical elements carried by the second tube with respect to each other independently of the position of such second tube with respect to the other two tubes.

13. An instrument of the character described, comprising objective optical elements and a device carrying the same, erecting optical elements and a device carrying the same, eye piece optical elements and a device carrying the same, and an eye shield and a device carrying the same, and means for relatively adjusting the said devices and varying the magnification.

14. An instrument of the character described comprising objective optical elements carried by a tube, erecting optical elements carried by a tube, eye piece optical elements carried by a tube, and an eye shield carried by a tube, and means for varying the magnification by moving the tubes carrying the erecting elements, eye piece elements, and shields longitudinally with respect to each other.

15. An instrument of the character described comprising objective optical elements carried by a tube, erecting optical elements carried by a tube, eye piece optical elements carried by a tube, and an eye shield carried by a tube, and means for varying the magnification by moving the tubes carrying the erecting elements, eye piece elements, and shields longitudinally with respect to each other consisting of studs on such tubes and an inclosing rotatable shell having slots adapted to be engaged by such studs.

In testimony whereof I affix my signature in presence of two witnesses.

WILLIE L. E. KEUFFEL.

Witnesses:
OTTO FREUND, Jr.,
BOWDEWINE B. VAN SICKLE.